United States Patent
Jang et al.

(10) Patent No.: US 9,717,077 B2
(45) Date of Patent: *Jul. 25, 2017

(54) METHOD AND APPARATUS FOR DEACTIVATING SECONDARY CARRIERS IN MOBILE COMMUNICATION SYSTEM USING CARRIER AGGREGATION

(71) Applicant: Samsung Electronics Co., Ltd., Suwon-si, Gyeonggi-do (KR)

(72) Inventors: Jaehyuk Jang, Suwon-si (KR); Soenghun Kim, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 374 days.

This patent is subject to a terminal disclaimer.

(21) Appl. No.: 14/597,750

(22) Filed: Jan. 15, 2015

(65) Prior Publication Data

US 2015/0124766 A1 May 7, 2015

Related U.S. Application Data

(63) Continuation of application No. 14/554,814, filed on Nov. 26, 2014, which is a continuation of application
(Continued)

(51) Int. Cl.
*H04W 72/04* (2009.01)
*H04W 72/08* (2009.01)
(Continued)

(52) U.S. Cl.
CPC ........... *H04W 72/042* (2013.01); *H04L 5/001* (2013.01); *H04L 5/0032* (2013.01);
(Continued)

(58) Field of Classification Search
None
See application file for complete search history.

(56) References Cited

U.S. PATENT DOCUMENTS 8,917,643 B2 12/2014 Lee et al.
2009/0168107 A1 7/2009 Takeuchi et al.
(Continued)

FOREIGN PATENT DOCUMENTS

AU 2010-239911 A1 11/2011
CN 103119996 A 5/2013
(Continued)

OTHER PUBLICATIONS

Supplemental European Search Report for PCT/KR2012001286, Sep. 12, 2016, European Patent Office, all pages.*
(Continued)

*Primary Examiner* — Candal Elpenord
*Assistant Examiner* — Adam Duda
(74) *Attorney, Agent, or Firm* — Jefferson IP Law, LLP

(57) ABSTRACT

A method and an apparatus in a mobile communication system are provided. The method includes receiving, by a terminal, first information for activating a secondary cell (SCell) from a base station, activating, by the terminal, the SCell based on the first information, starting, by the terminal, a timer associated with the SCell, restarting, by the terminal, if second information for the activated SCell is received from the base station, the timer associated with the SCell, and if the timer expires, applying by the terminal, one or more corresponding actions for deactivating the SCell no later than in a predefined subframe. The timer is a value in a number of radio frames.

20 Claims, 6 Drawing Sheets

Related U.S. Application Data

No. 13/400,916, filed on Feb. 21, 2012, now Pat. No. 8,917,664.

(60) Provisional application No. 61/444,844, filed on Feb. 21, 2011.

(51) Int. Cl.

| | |
|---|---|
| *H04W 24/10* | (2009.01) |
| *H04L 5/00* | (2006.01) |
| *H04L 5/14* | (2006.01) |
| *H04W 52/14* | (2009.01) |
| *H04W 52/22* | (2009.01) |
| *H04W 52/28* | (2009.01) |
| *H04W 52/34* | (2009.01) |
| *H04W 52/36* | (2009.01) |
| *H04W 88/06* | (2009.01) |
| *H04W 72/14* | (2009.01) |
| *H04W 72/12* | (2009.01) |
| *H04W 72/00* | (2009.01) |
| *H04W 28/04* | (2009.01) |
| *H04W 88/02* | (2009.01) |
| *H04W 88/08* | (2009.01) |

(52) U.S. Cl.
CPC .......... *H04L 5/0078* (2013.01); *H04L 5/0082* (2013.01); *H04L 5/0098* (2013.01); *H04L 5/1469* (2013.01); *H04W 24/10* (2013.01); *H04W 52/146* (2013.01); *H04W 52/228* (2013.01); *H04W 52/286* (2013.01); *H04W 52/346* (2013.01); *H04W 52/367* (2013.01); *H04W 72/085* (2013.01); *H04W 72/087* (2013.01); *H04W 72/14* (2013.01); *H04W 88/06* (2013.01); *H04L 5/0057* (2013.01); *H04W 28/048* (2013.01); *H04W 72/00* (2013.01); *H04W 72/1231* (2013.01); *H04W 72/1236* (2013.01); *H04W 88/02* (2013.01); *H04W 88/08* (2013.01); *Y02B 60/50* (2013.01)

(56) References Cited

U.S. PATENT DOCUMENTS

| | | | |
|---|---|---|---|
| 2010/0304786 A1 | 12/2010 | Ou | |
| 2010/0316026 A1 | 12/2010 | Lee et al. | |
| 2011/0002284 A1 | 1/2011 | Talwar et al. | |
| 2012/0057490 A1* | 3/2012 | Park .................. | H04L 5/001 370/252 |
| 2012/0188931 A1 | 7/2012 | Lee et al. | |
| 2013/0121203 A1 | 5/2013 | Jung et al. | |
| 2013/0279343 A1 | 10/2013 | Jeong et al. | |
| 2015/0256301 A1* | 9/2015 | Kim .................. | H04L 5/001 370/329 |
| 2015/0316517 A1 | 11/2015 | Ollier et al. | |
| 2016/0081045 A1 | 3/2016 | Boström et al. | |

FOREIGN PATENT DOCUMENTS

| | | |
|---|---|---|
| CN | 103141041 A | 6/2013 |
| JP | 2012-529841 A1 | 11/2012 |
| KR | 10-2010-0118067 A | 11/2010 |
| KR | 10-2010-0127733 A | 12/2010 |
| KR | 10-2010-0127738 A | 12/2010 |
| KR | 10-2011-0011518 A | 2/2011 |
| KR | 10-2012-0081549 A | 7/2012 |
| WO | 2012-108876 A1 | 8/2012 |

OTHER PUBLICATIONS

IP Australia Notice of Acceptance for 2012222013, Jan. 27, 2016, Australian Government / IP Australia, all pages.*
ZTE, "Clarification of Timing Requirements for Activation and Deactivation of SCells in TDD mode," Feb. 21, 2011, 3GPP, all pages.*
3GPP TSG Ran2 Meeting #73, "Change Request," Feb. 21, 2011, 3GPP, all pages.*
3GPP TS 36.331 V10.0.0, "3rd Generation Partnership Project; Technical Specification Group Radio Access Network; (E-UTRA); (RCC); Protocol specitcation (Release 10)", Dec. 2010.
3GPP TS 36.321 V10.1.0, "Medium Access Control (MAC) protocol specification (Release 10)", Mar. 31, 2011.
Samsung, CSI reporting and SRS timing upon SCell activation/deactivation [online] 3GPP TSG-RAN WG1#63b R1-110069, Jan. 21, 2011.
"3rd Generation Partnership Project; Technical Specification Group Radio Access Network; Evolved Universal Terrestrial Radio Access (EUTRA); Medium Access Control (MAC) protocol specification (Release10)", 3GPP Standard; GPP TS 36.321,3rd Generation Partnership Project (3GPP), Mobile Competence Centre; 650, Route Des Lucioles; F-06921 Sophia-Antipolis Cedex ; France, No. V10.0.0, pp. 1-53, XP050462124, Dec. 17, 2010.
"3rd Generation Partnership Project; Technical Specification Group Radio Access Network; Evolved Universal Terrestrial Radio Access (E-UTRA); Physical layer procedures (Release 10)", 3GPP Standard; 3GPP TS 36.213, 3rd Generation Partnership Project (3GPP), Mobile Competence Centre; 650, Route Des Lucioles; F-06921 Sophia-Anti Polis Cedex; France, No. V10.0.1, pp. 1-98, XP050462385, Dec. 2010.
ZTE: "Clarilication of Timing Requirements for Activation and Deactivation 01 SCells in TDD mode", 3GPP Draft; R4-110871 , 3rd Generation Partnership Project (3GPP), Mobile Competence Centre; 650, Route Des Lucioles; F-06921 Sophia-Antipolis Cedex ; France, vol. RAN WG4, no. Taipei, Taiwan; Feb. 21, 2011, XP050500940, Feb. 16, 2011.
Huawei et al: "Consideration on DRX in eICIC scenario", 3GPP Draft; R2-111021, XP050493546, Feb. 14, 2011.
Alcatel-Lucent et al: "RRC signalling design for Almost Blank Subframe patterns", 3GPP Draft; R2-106451, XP050492280, Nov. 9, 2010.
Research in Motion UK Limited: UE power saving for eICIC, 3GPP Draft; R2-111233, XP050493735, Feb. 15, 2011.
Interdigital Communications: Report of Email discussion #26 on SCell Activation in LTE CA, 3GPP Draft; R2-11384 (Report Email#26 Scell Activation LTE CA), 3rd Generation Partnership Project (3GPP), Mobile Competence Centre ; 650, Route Des Lucioles ; F-06921 Sophia-Antipolis Cedex France, vol. RAN WG2, no. Taipei, Taiwan; Feb. 21, 2011-Feb. 25, 2011, XP050605673, Feb. 18, 2011.
Ericsson et al: "Adding a Power Management indication in PHR", 3GPP Draft; 36321_CRXXXX_(REL-10)_R2-110940 Adding a Power Management Indicator in PHR, 3rd Generation Partnership Project (3GPP), Mobile Competence Centre ; 650, Route Des Lucioles ; F-06921 Sophia-Antipolis Cedex; France, vol. RAN WG2, no. Taipei, Taiwan; Feb. 21, 2011-Feb. 25, 2011, XP050605646, Feb. 14, 2011.
ZTE, "Downlink Data and Control Structure for LTE-A", Jan. 2009, 3GPP TSG-RAN WG1, all pages.
Motorola, "Comparison of PDCCH Structures for Carrier Aggregation", Mar. 2009, 3GPP TSG RAN1 #56bis, all pages.
Huawei, "PUCCH Design for Carrier Aggregation", Feb. 2009, 3GPP TSG RAN WG1 Meeting #56, all pages.
Samsung, "SCell deactivation and CQI reporting", 3GPP TSG-RAN2#73 meeting R2-110881, Feb. 14, 2011.
LG Electronics Inc., "CQI reporting at deactivation", 3GPP TSG-RAN2 Meeting #73 R2-111225, Feb. 15, 2011.
ZTE, "SCell Measurement Requirements for Carrier Aggregation (CA)", 3GPP TSG-RAN WG4 Meeting #57AH R4-110363, Jan. 12, 2011.

* cited by examiner

METHOD AND APPARATUS FOR DEACTIVATING SECONDARY CARRIERS IN MOBILE COMMUNICATION SYSTEM USING CARRIER AGGREGATION

CROSS-REFERENCE TO RELATED APPLICATIONS

This is a continuation application of U.S. patent application Ser. No. 14/554,814, filed on Nov. 26, 2014, which is a continuation of U.S. patent application Ser. No. 13/400,916, filed on Feb. 21, 2012, which issued as U.S. Pat. No. 8,917,664 on Dec. 23, 2014, and which claims the benefit under 35 U.S.C. §119(e) of a U.S. Provisional application filed on Feb. 21, 2011 in the U.S. Patent and Trademark Office and assigned Ser. No. 61/444,844, the entire disclosures of which are hereby incorporated by reference.

BACKGROUND OF THE INVENTION

1. Field of the Invention

The present invention relates to a mobile communication system. More particularly, the present invention relates to a method for deactivating secondary carriers in a Long Term Evolution (LTE) system using Carrier Aggregation (CA).

2. Description of the Related Art

In recent years, with rapid advances in wireless communication technologies, mobile communication systems have evolved across generations. Currently, the Long Term Evolution (LTE) system attracts attention as a fourth generation mobile communication system. To meet explosive growth in traffic demand, various techniques including Carrier Aggregation (CA) have been introduced to the LTE system. In most cases, a single carrier is used in communication between a User Equipment (UE) and an evolved Node B (eNB) (e.g., a base station). When Carrier Aggregation is employed, a primary carrier and one or more secondary carriers may be used in communication between a User Equipment and a base station, thereby significantly increasing the data transfer rate by an amount corresponding to the number of secondary carriers. In an LTE system, a primary carrier is termed a Primary Cell (PCell), and a secondary carrier is termed a Secondary Cell (SCell).

For Carrier Aggregation, additional efforts are needed to control Secondary Cells at the Primary Cell. For example, a determination as to whether to use Secondary Cells at a specific Primary Cell may be made, a determination as to conditions for activating and deactivating the secondary cells may be determined, and the conditions for activating and deactivating the secondary cells may be monitored. More specifically, it is necessary to specify a concrete scheme for deactivating secondary cells.

Therefore, a need exists for a system and method for performing a self-diagnosis of a device without the inconvenience caused when manually selecting a self-diagnosis item from a computer or a user interface.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method for deactivating secondary cells in a mobile communication system using carrier aggregation.

In accordance with an exemplary embodiment of the present invention, a method by a terminal in a mobile communication system. The method includes receiving, by the terminal, first information for activating a secondary cell (SCell) from a base station, activating, by the terminal, the SCell based on the first information, starting, by the terminal, a timer associated with the Scell, restarting, by the terminal, if second information for the activated SCell is received from the base station, the timer associated with the Scell, and if the timer expires, applying by the terminal, one or more corresponding actions for deactivating the SCell no later than in a predefined subframe. The timer is a value in a number of radio frames.

In accordance with another exemplary embodiment of the present invention, a method by a base station in a mobile communication system is provided. The method includes generating, by the base station, first information for activating a secondary cell (SCell), and transmitting, by the base station, the first information to a terminal. The SCell is activated based on the first information, a timer associated with the SCell is started, if the timer expires in subframe n one or more corresponding actions for deactivating the SCell are applied no later than in a predefined subframe by the terminal, and the timer is a value in a number of radio frames.

In accordance with yet another exemplary embodiment of the present invention, a terminal in a mobile communication system is provided. The terminal includes a transceiver for transmitting and receiving a signal, and a controller configured to receive first information for activating a secondary cell (SCell) from a base station, to activate the SCell based on the first information, to start a timer associated with the SCell, to restart, if second information for the activated SCell is received from the base station, the timer associated with the SCell, and if the timer expires, to apply one or more corresponding actions for deactivating the SCell no later than in a predefined subframe. The timer is a value in a number of radio frames.

In accordance with still another exemplary embodiment of the present invention, a base station in a mobile communication system is provided. The base station includes a transceiver for transmitting and receiving a signal, and a controller configured to generate first information for activating a secondary cell (SCell), and to transmit the first information to a terminal. The SCell is activated based on the first information, a timer associated with the SCell is started, if the timer expires in subframe n one or more corresponding actions for deactivating the SCell are applied no later than in a predefined subframe by the terminal, and the timer is a value in a number of radio frames.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention relates to a method and an apparatus for deactivating secondary carriers in a User Equipment (UE) utilizing Carrier Aggregation (CA).

Figure 1:
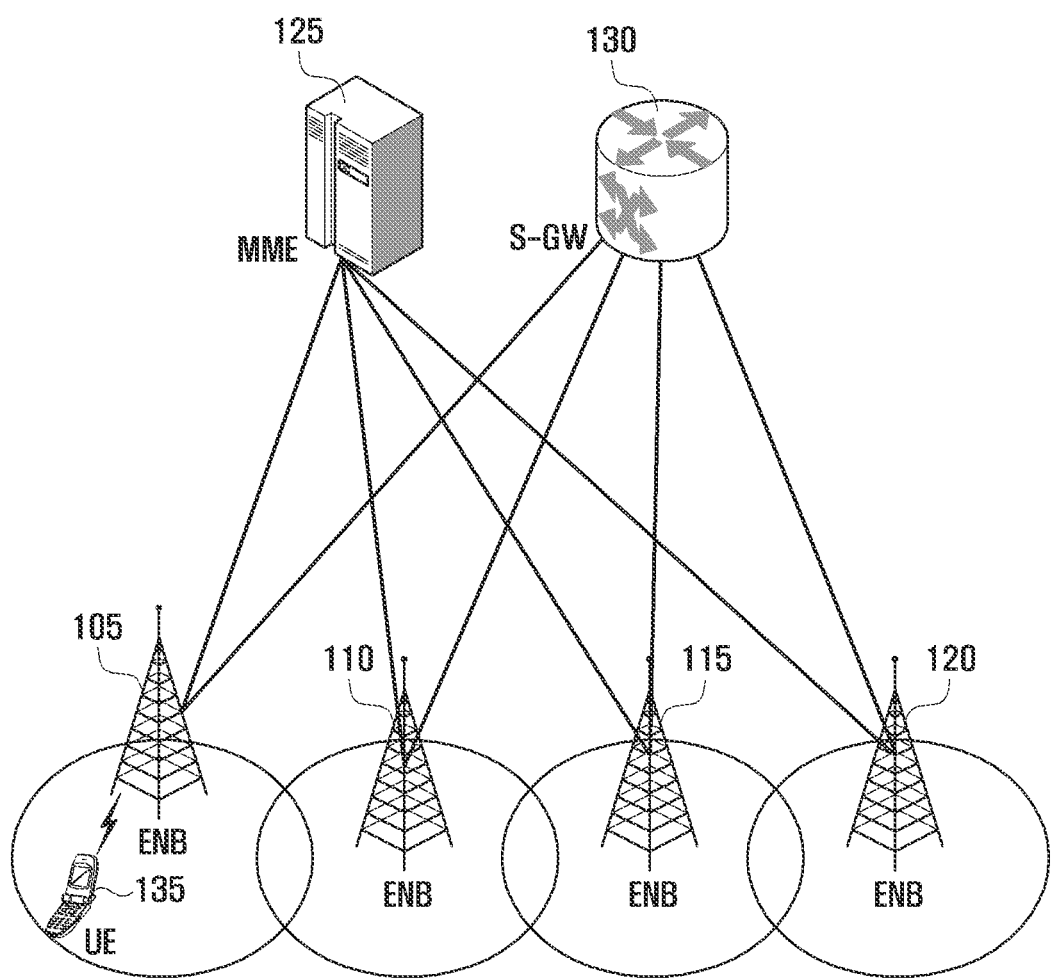
FIG. 1 illustrates a Long Term Evolution (LTE) system architecture according to an exemplary embodiment of the present invention.

FIG. 1 illustrates a Long Term Evolution (LTE) system architecture according to an exemplary embodiment of the present invention.

Referring to FIG. 1, an LTE radio access network includes base stations such as, for example, evolved Node Bs (eNBs) 105, 110, 115 and 120, a Mobility Management Entity (MME) 125, and a Serving-Gateway (S-GW) 130. A User Equipment (UE) 135 may connect to an external network through the eNBs 105 to 120 (e.g., 105, 110, 115, and 120) and the S-GW 130.

The eNBs 105 to 120 correspond to Node Bs of a Universal Mobile Telecommunications System (UMTS). An eNB is connected to the User Equipment 135 through a wireless channel, and may perform complex functions in comparison to an existing Node B. In the LTE system, because all user traffic including real-time services such as, for example, Voice over Internet Protocol (VoIP) services, is served by shared channels, it is necessary to perform scheduling on the basis of collected status information regarding buffers, available transmit powers, and channels of User Equipments. Each of the eNBs 105 to 120 performs this scheduling function. In most cases, a single eNB controls multiple cells. To achieve a data rate of 100 Mbps, the LTE system utilizes Orthogonal Frequency Division Multiplexing (OFDM) in a 20 MHz bandwidth as a radio access technology. The LTE system employs Adaptive Modulation and Coding (AMC) to determine the modulation scheme and channel coding rate according to channel states of a User Equipment. The S-GW 130 provides data bearers, and creates and removes a data bearer under control of the MME 125. The MME 125 performs various control functions including mobility management for User Equipments, and is connected to multiple eNBs.

Figure 2:
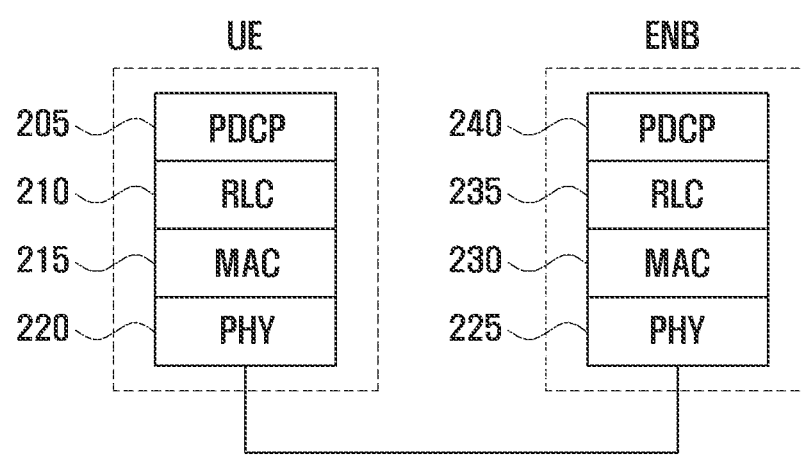
FIG. 2 illustrates a hierarchy of wireless protocols in an LTE system according to an exemplary embodiment of the present invention.

FIG. 2 illustrates a hierarchy of wireless protocols in a Long Term Evolution (LTE) system according to an exemplary embodiment of the present invention.

Referring to FIG. 2, in the LTE system, a User Equipment and an eNB each include a wireless protocol stack composed of a Packet Data Convergence Protocol (PDCP) layer 205 or 240, a Radio Link Control (RLC) layer 210 or 235, a Medium Access Control (MAC) layer 215 or 230, and a Physical (PHY) layer 220 or 225. The PDCP layer 205 or 240 performs compression and decompression of IP headers. The RLC layer 210 or 235 reconfigures PDCP Protocol Data Units (PDUs) to a suitable size to conduct Automatic Repeat reQuest (ARQ) operations. The MAC layer 215 or 230 is connected to multiple RLC layer devices in a User Equipment, and multiplexes RLC PDUs into MAC PDUs, or demultiplexes MAC PDUs into RLC PDUs. The Physical layer 220 or 225 converts higher layer data into OFDM symbols by means of channel coding and modulation and transmits the OFDM symbols through a wireless channel, or converts OFDM symbols received through a wireless channel into higher layer data by means of demodulation and channel decoding, and forwards the data to higher layers.

Figure 3:
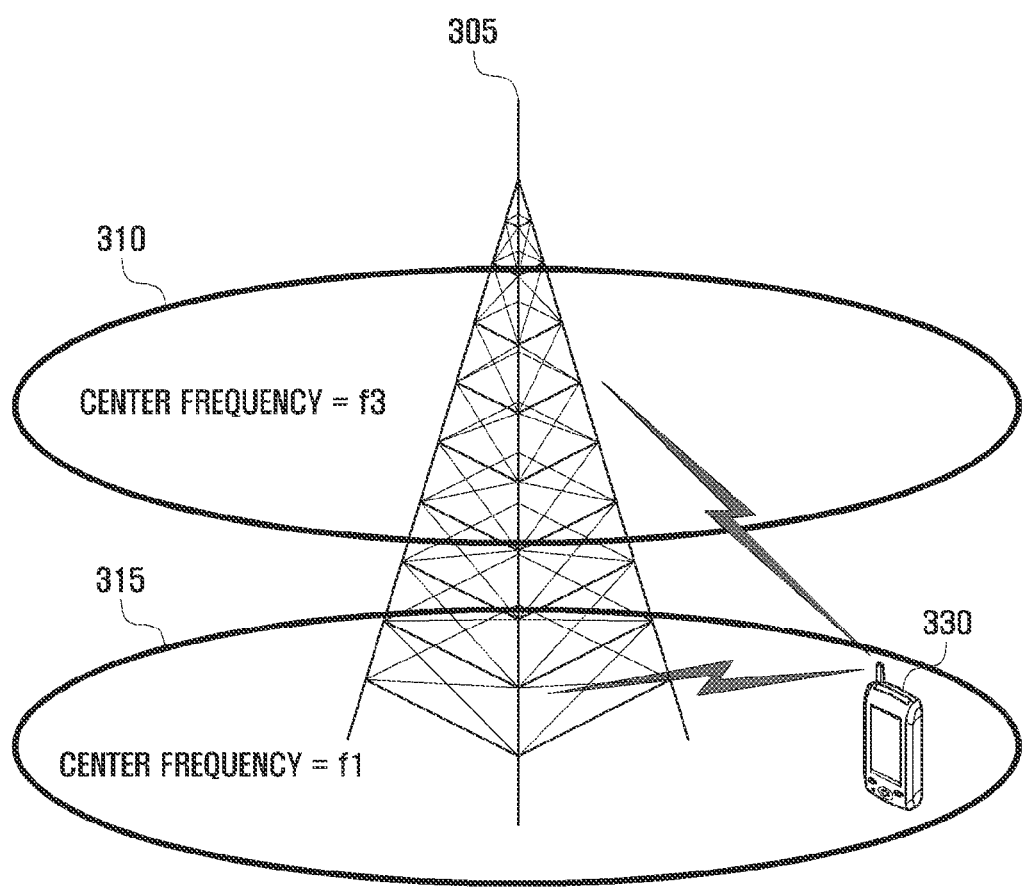
FIG. 3 illustrates Carrier Aggregation (CA) at a User Equipment (UE) according to an exemplary embodiment of the present invention.

FIG. 3 illustrates Carrier Aggregation (CA) at a User Equipment (UE) according to an exemplary embodiment of the present invention.

Referring to FIG. 3, an eNB 305 transmits and receives signals through multiple carriers across multiple frequency bands. For example, assume that the eNB 305 uses a carrier 315 with a center frequency f1 and a carrier 310 with a center frequency f3. A regular User Equipment uses one of the two carriers 310 and 315 to send and receive data. A User Equipment 330 having a Carrier Aggregation capability may use multiple carriers including the carriers 310 and 315 in parallel to send and receive data. Hence, the eNB 305 may assign two or more carriers to the User Equipment 330 having a Carrier Aggregation capability according to service conditions, thereby increasing the data rate of the User Equipment 330.

In a traditional sense, it may be considered that one cell is formed of a downlink carrier and an uplink carrier provided by the same base station. In Carrier Aggregation, a User Equipment may be considered as sending and receiving data through multiple cells in parallel. Hence, the maximum data rate of the User Equipment may be increased in proportion to the number of aggregated carriers.

In the description, when a User Equipment receives data through a downlink carrier and transmits data through an uplink carrier corresponds in meaning to a case in which the User Equipment sends and receives data using control and data channels provided by a cell corresponding to the center frequencies and frequency bands characterizing the carriers. For ease of description, exemplary embodiments of the present invention are focused on the LTE system. However, exemplary embodiments of the present invention may be applied to various wireless communication systems supporting Carrier Aggregation.

Figure 4:
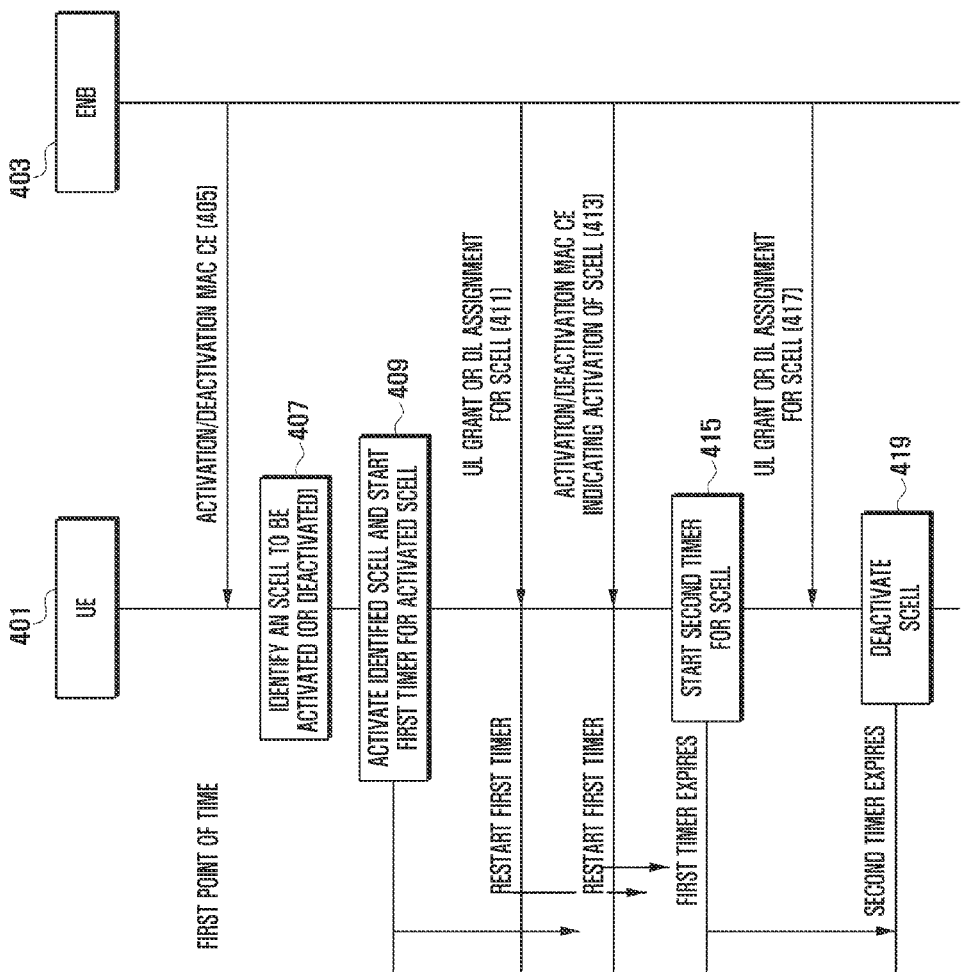
FIG. 4 is a message sequence chart describing a method for deactivating secondary carriers according to an exemplary embodiment of the present invention.

FIG. 4 is a message sequence chart describing a method for deactivating secondary carriers according to an exemplary embodiment of the present invention.

Referring to FIG. 4, the eNB 403 sends an activation/deactivation MAC Control Element (CE) indicating one of configured SCells to be activated/deactivated to the User Equipment 401 at step 405. For example, the activation/deactivation MAC CE is an 8-bit MAC CE, and includes seven C fields and one R (i.e., reserved) field. The seven C fields may be denoted by C7, C6, C5, C4, C3, C2 and C1. Ci set to '1' indicates activation of SCell i, and Ci set to '0' indicates deactivation of SCell i (i.e., where i corresponds to a positive integer). That is, the activation/deactivation MAC CE indicates activation or deactivation of secondary carriers assigned to a User Equipment.

Upon reception of the activation/deactivation MAC CE, the User Equipment 401 identifies SCells to be activated or deactivated at step 407. When a specific SCell is to be activated, the User Equipment 401 activates the SCell and starts a first timer for the activated SCell at step 409.

The first timer is used to deactivate an associated SCell, which has been activated by means of an activation/deactivation MAC CE, without utilization of another activation/deactivation MAC CE.

Thereafter, whenever the eNB 403 allocates downlink or uplink resources to the SCell through the Physical Downlink Control Channel (PDCCH), the User Equipment 401 restarts the first timer at step 411.

Whenever an activation/deactivation MAC CE indicating reactivation of the SCell is received from the eNB 403, the User Equipment 401 restarts the first timer at step 413. For example, the first timer is a timer lasting for a time corresponding to m frames. The first timer may be set by means of a Radio Resource Control (RRC) layer message.

When downlink or uplink resources are not allocated to the SCell and an activation/deactivation MAC CE indicating reactivation of the SCell is not received before expiration of the first timer, the User Equipment 401 starts a second timer for the SCell without immediate deactivation of the SCell at step 415.

The second timer is used to allow a time for the User Equipment 401 to discontinue transmission of Sounding Reference Signals (SRS) for the SCell and transmission of a Channel Quality Indicator (CQI)/a Precoding Matrix Index (PMI)/a Rank Indicator (RI)/a Precoder Type Indication (PTI), so as not to disrupt normal operations of the eNB 403 by deactivating the SCell at the time of expiration of the second timer. The CQI/PMI/RI/PTI is described in more detail below.

CQI: corresponds to a recommended transport format satisfying a bit error rate of 10 percent
    PMI: corresponds to an index for closed-loop spatial multiplexing
    RI: corresponds to a recommended transmission rank
    PTI: corresponds to an indication of the coding.

When the eNB 403 allocates downlink or uplink resources to the SCell (e.g., UL grant or DL assignment) through the PDCCH before expiration of the second timer, the User Equipment 401 ignores such allocation and does not restart the first timer or the second timer at step 417.

After the second timer is started, the User Equipment 401 may discontinue some operations, which are not related to interaction with the eNB 403, before expiration of the second timer. For example, the User Equipment 401 may discontinue the operations not having a preset discontinuation time before expiration of the second timer. An example of such operations that may the User Equipment 401 may discontinue include: monitoring of PDCCH from the SCell, and transmission of SRS.

The User Equipment 401 may discontinue some operations, which are related to interactions with the eNB 403, after expiration of the second timer so as not to disrupt normal operations of the eNB 403. Examples of such operations, which must be discontinued after expiration of the second timer, include: reporting of Channel State Information (CSI), and transmission of CQI/PMI/RI/PTI.

Thereafter, when the second timer expires, the User Equipment 401 deactivates the SCell at step 419. Here, the second timer lasts for a time corresponding to n frames, where n may be a fixed non-negative integer (for example, n=8). After expiration of the second timer, the User Equipment 401 discontinues transmission of SRS and CQI/PMI/RI/PTI as to the SCell.

Figure 5:
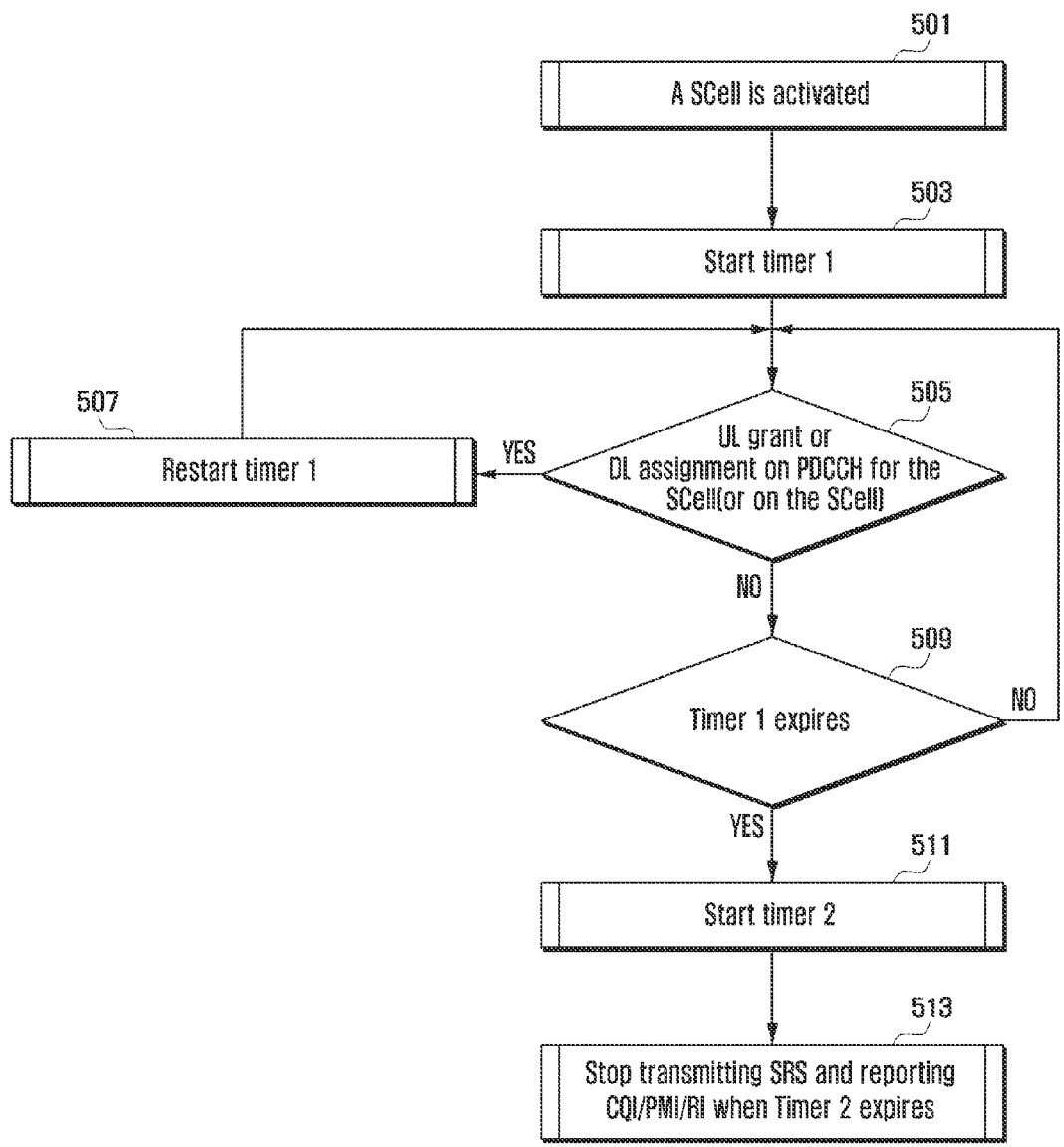
FIG. 5 is a flowchart of a procedure performed by a User Equipment (UE) according to, for example, the method provided in FIG. 4, according to an exemplary embodiment of the present invention.

FIG. 5 is a flowchart of a procedure performed by a User Equipment (UE) according to, for example, the method provided in FIG. 4, according to an exemplary embodiment of the present invention.

When an activation/deactivation MAC CE including an 8-bit bitmap is received, the User Equipment checks whether an SCell to be activated is present, and, if such an SCell is present, then the User Equipment activates the SCell at step 501. Specifically, the User Equipment identifies deactivated SCells before reception of an activation/deactivation MAC CE, examines a bitmap of a received activation/deactivation MAC CE, and activates an SCell indicated by the bitmap among the deactivated SCells. The activation/deactivation MAC CE may be referred to as a signal for determining an SCell to be activated.

The User Equipment starts a first timer for the newly activated SCell at step 503. As an example, the duration of the first timer is resettable and may be set by the eNB during an RRC connection reconfiguration process. The User Equipment determines whether downlink or uplink resources are allocated to the SCell through the PDCCH or whether an activation/deactivation MAC CE indicating reactivation of the SCell is received at step 505. When downlink or uplink resources are allocated to the SCell or an activation/deactivation MAC CE indicating reactivation of the SCell is received, the User Equipment restarts the first timer at step 507 and returns to step 505. Otherwise, when the first timer expires at step 509, the User Equipment starts a second timer as to the SCell at step 511. The duration of the second timer is fixed and not resettable (for example, 8 frame time). Hence, the eNB does not have to notify the User Equipment of the duration for the second timer, and the duration may be specified in the standard.

When the second timer expires (e.g., when a fixed time has passed after expiration of the first timer), the User Equipment deactivates the SCell and discontinues transmission of SRS and CQI/PMI/RI/PTI as to the SCell at step 513. The User Equipment also discontinues PDCCH reception as to the deactivated SCell. After starting the second timer, the User Equipment ignores directives on allocation of downlink or uplink resources to the SCell. For example, this may be achieved by discontinuing PDCCH monitoring of the SCell after expiration of the first timer. That is, PDCCH monitoring of the SCell is discontinued after expiration of the first timer, and transmission of SRS and CQI/PMI/RI/PTI is discontinued after expiration of the second timer.

Figure 6:
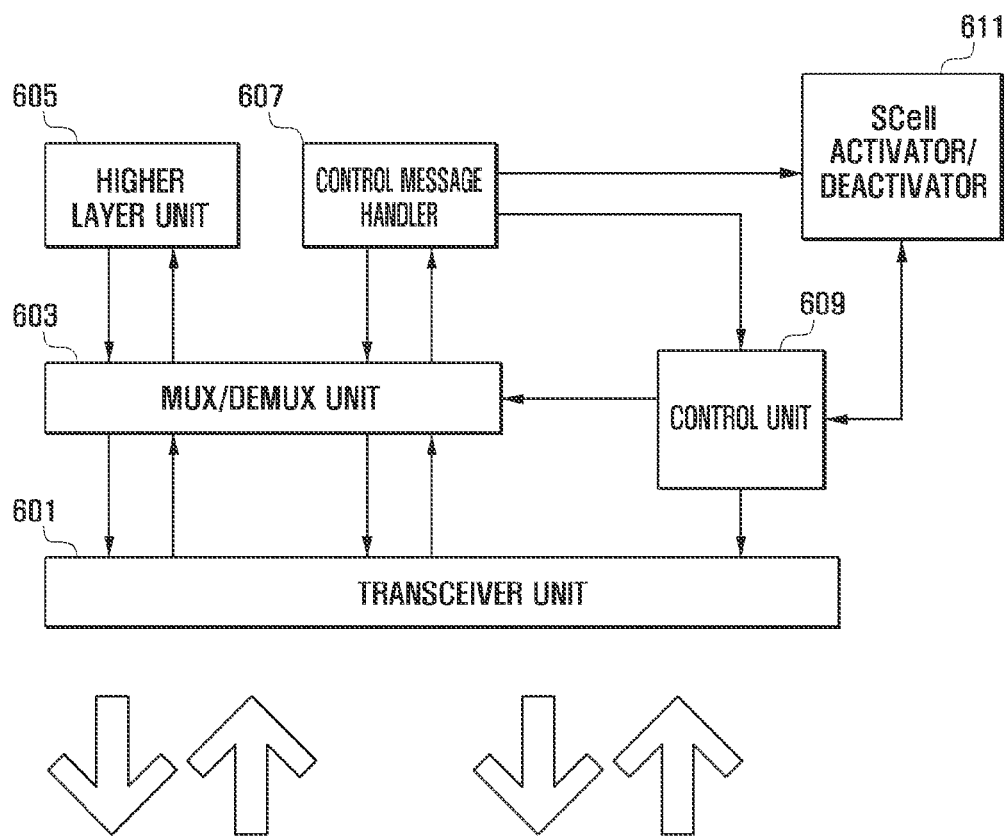
FIG. 6 is a block diagram of a User Equipment (UE) according to an exemplary embodiment of the present invention.

FIG. 6 is a block diagram of a User Equipment (UE) according to an exemplary embodiment of the present invention.

Referring to FIG. 6, the User Equipment may include a transceiver unit 601, a multiplexer/demultiplexer (mux/demux) unit 603, a higher layer unit 605, a control message handler 607, a control unit 609, and an Scell activator/deactivator 611.

In the User Equipment, data is sent and received through the higher layer unit 605, and control messages are sent and received through the control message handler 607. For transmission, data is multiplexed by the mux/demux unit 603 and sent through the transceiver unit 601 under control of the control unit 609. For reception, a message signal received by the transceiver unit 601 is demultiplexed by the mux/demux unit 603 and forwarded to the higher layer unit 605 or the control message handler 607 according to the message type, under control of the control unit 609.

When an activation/deactivation MAC CE is received, the control message handler 607 forwards the same to the Scell activator/deactivator 611. Under control of the control unit 609, the Scell activator/deactivator 611 activates an SCell indicated by the activation/deactivation MAC CE and starts a first timer for the newly activated SCell. When downlink or uplink resources are allocated to the SCell or an activation/deactivation MAC CE indicating reactivation of the SCell is received, the Scell activator/deactivator 611 restarts the first timer.

Thereafter, when the first timer expires, the Scell activator/deactivator 611 starts a second timer as to the SCell. After starting the second timer, the control unit 609 may discontinue PDCCH reception as to the SCell for downlink or uplink data transmission. When the second timer expires, the control unit 609 discontinues transmission of SRS and CQI/PMI/RI/PTI as to the SCell.

As described above, according to exemplary embodiments of the present invention, in utilization of Carrier Aggregation, deactivation of a specific SCell is conducted by means of two timers. Hence, communication may be accurately performed while reducing power consumption.

In a feature of the present invention, the proposed method enables successful completion of operations needed to deactivate secondary carriers without error.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method by a terminal in a mobile communication system, the method comprising:
   receiving, by the terminal, first information for activating a secondary cell (SCell) from a base station;
   activating, by the terminal, the SCell based on the first information;
   starting, by the terminal, a timer associated with the SCell;
   restarting, by the terminal, if second information for the activated SCell is received from the base station, the timer associated with the SCell; and
   if the timer expires, applying by the terminal, one or more corresponding actions for deactivating the SCell no later than in a predefined subframe,
   wherein the timer is a value in a number of radio frames.

2. The method of claim 1, wherein the one or more corresponding actions include preventing, by the terminal, from reporting at least one of channel quality indicator (CQI), precoding matrix index (PMI), rank indicator (RI), and precoder type indication (PTI) for the SCell.

3. The method of claim 1, wherein the one or more corresponding actions include at least one of preventing, by the terminal, from transmitting a sounding reference signal (SRS) on the SCell, preventing, by the terminal, from monitoring a physical downlink control channel (PDCCH) on the SCell, and preventing, by the terminal, from monitoring a PDCCH for the SCell.

4. The method of claim 1, wherein the second information includes at least one of an uplink grant on the activated SCell, a downlink assignment on the activated SCell, and a control message for activating the SCell.

5. The method of claim 1, wherein the first information includes a bitmap indicator corresponding to at least one SCell.

6. A method by a base station in a mobile communication system, the method comprising:
   generating, by the base station, first information for activating a secondary cell (SCell); and
   transmitting, by the base station, the first information to a terminal,
   wherein the SCell is activated based on the first information, a timer associated with the SCell is started, if the timer expires in subframe n one or more corresponding actions for deactivating the SCell are applied no later than in a predefined subframe by the terminal, and the timer is a value in a number of radio frames.

7. The method of claim 6, wherein the one or more corresponding actions include preventing, by the terminal, from reporting at least one of channel quality indicator (CQI), precoding matrix index (PMI), rank indicator (RI), and precoder type indication (PTI) for the SCell.

8. The method of claim 6, wherein the one or more corresponding actions include at least one of preventing, by the terminal, from transmitting a sounding reference signal (SRS) on the SCell, preventing, by the terminal, from monitoring a physical downlink control channel (PDCCH) on the SCell, and preventing, by the terminal, from monitoring a PDCCH for the SCell.

9. The method of claim 6, wherein the second information includes at least one of an uplink grant on the activated SCell, a downlink assignment on the activated SCell, and a control message for activating the SCell.

10. The method of claim 6, wherein the first information includes a bitmap indicator corresponding to at least one SCell.

11. A terminal in a mobile communication system, the terminal comprising:
   a transceiver for transmitting and receiving a signal; and
   a controller configured:
      to receive first information for activating a secondary cell (SCell) from a base station,
      to activate the SCell based on the first information, to start a timer associated with the SCell,
      to restart, if second information for the activated SCell is received from the base station, the timer associated with the SCell, and
      if the timer expires, to apply one or more corresponding actions for deactivating the SCell no later than in a predefined subframe,
   wherein the timer is a value in a number of radio frames.

12. The terminal of claim 11, wherein the one or more corresponding actions include preventing, by the terminal, from reporting at least one of channel quality indicator (CQI), precoding matrix index (PMI), rank indicator (RI), and precoder type indication (PTI) for the SCell.

13. The terminal of claim 11, wherein the one or more corresponding actions include at least one of preventing, by the terminal, from transmitting a sounding reference signal (SRS) on the SCell, preventing, by the terminal, from monitoring a physical downlink control channel (PDCCH) on the SCell, and preventing, by the terminal, from monitoring a PDCCH for the SCell.

14. The terminal of claim 11, wherein the second information includes at least one of an uplink grant on the activated SCell, a downlink assignment on the activated SCell, and a control message for activating the SCell.

15. The terminal of claim 11, wherein the first information includes a bitmap indicator corresponding to at least one SCell.

16. A base station in a mobile communication system, the base station including:
 a transceiver for transmitting and receiving a signal; and
 a controller configured:
  to generate first information for activating a secondary cell (SCell), and
  to transmit the first information to a terminal,
 wherein the SCell is activated based on the first information, a timer associated with the SCell is started, if the timer expires in subframe n one or more corresponding actions for deactivating the SCell are applied no later than in a predefined subframe by the terminal, and the timer is a value in a number of radio frames.

17. The base station of claim 16, wherein the one or more corresponding actions include preventing, by the terminal, from reporting at least one of channel quality indicator (CQI), precoding matrix index (PMI), rank indicator (RI), and precoder type indication (PTI) for the SCell.

18. The base station of claim 16, wherein the one or more corresponding actions include at least one of preventing, by the terminal, from transmitting a sounding reference signal (SRS) on the SCell, preventing, by the terminal, from monitoring a physical downlink control channel (PDCCH) on the SCell, and preventing, by the terminal, from monitoring a PDCCH for the SCell.

19. The base station of claim 16, wherein the second information includes at least one of an uplink grant on the activated SCell, a downlink assignment on the activated SCell, and a control message for activating the SCell.

20. The base station of claim 16, wherein the first information includes a bitmap indicator corresponding to at least one SCell.

* * * * *